US006891787B1

United States Patent
Tada

(10) Patent No.: US 6,891,787 B1
(45) Date of Patent: May 10, 2005

(54) APPARATUS FOR RECORDING/REPRODUCING SIGNAL ON/FROM OPTICAL DISK

(75) Inventor: Koichi Tada, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 844 days.

(21) Appl. No.: 09/642,886

(22) Filed: Aug. 22, 2000

(30) Foreign Application Priority Data

Aug. 24, 1999 (JP) ............................................ 11-237230
Aug. 31, 1999 (JP) ............................................ 11-245081

(51) Int. Cl.$^7$ ................................................ G11B 7/00
(52) U.S. Cl. ................................. 369/53.16; 369/59.17
(58) Field of Search .......................... 369/44.11, 44.13, 369/44.14, 44.25, 44.26, 44.27, 44.34, 44.41, 47.15, 47.17, 47.29, 47.27, 47.35, 53.11, 53.2, 53.23, 53.28, 53.34, 275.5, 53.15, 53.16, 53.35, 59.15, 59.17, 59.21, 124.05, 124.07, 124.12, 124.13

(56) References Cited

U.S. PATENT DOCUMENTS

| | | | | |
|---|---|---|---|---|
| 5,062,091 A | * | 10/1991 | Maeda et al. ............ | 369/13.02 |
| 5,526,332 A | * | 6/1996 | Yamada et al. .......... | 369/47.35 |
| 6,359,848 B1 | * | 3/2002 | Van Den Enden ....... | 369/53.29 |
| 6,388,954 B1 | * | 5/2002 | Awano et al. ............ | 369/13.02 |

FOREIGN PATENT DOCUMENTS

| | | |
|---|---|---|
| JP | 60-131639 A | 7/1985 |
| JP | 5-89492 | 4/1993 |
| JP | 8-203108 A | 8/1996 |

* cited by examiner

Primary Examiner—Thang V. Tran
Assistant Examiner—Bach Vuong
(74) Attorney, Agent, or Firm—Westerman, Hattori, Daniels & Adrian, LLP

(57) ABSTRACT

A defect detecting circuit generates a defect detection signal when the level of a sum signal obtained from an optical sensor in an optical pickup is lower than a predetermined level, and a gate circuit responds to the defect detection signal to set the level of a fine clock mark signal to zero, that is a difference signal obtained from the optical sensor in the optical pickup. A fine clock mark is thus distinguished from any defect such as scratch and a correct fine clock mark signal is accordingly generated. Alternatively, the value of a sum signal, which indicates the total amount of reflected light output from the optical pickup, is compared with a predetermined threshold. When the period in which the value of the sum signal is smaller than the threshold lasts for a predetermined threshold time period, it is determined that focus of an objective lens deviates from an optical disk and accordingly focus servo control is stopped. The threshold is defined by gradually reducing a drive signal while detecting peak and bottom values of the sum signal which is generated as the objective lens is moved in the direction of its optical axis, and then setting the threshold between the detected peak and bottom values. In this way, defocus of the objective lens is surely detected.

5 Claims, 14 Drawing Sheets

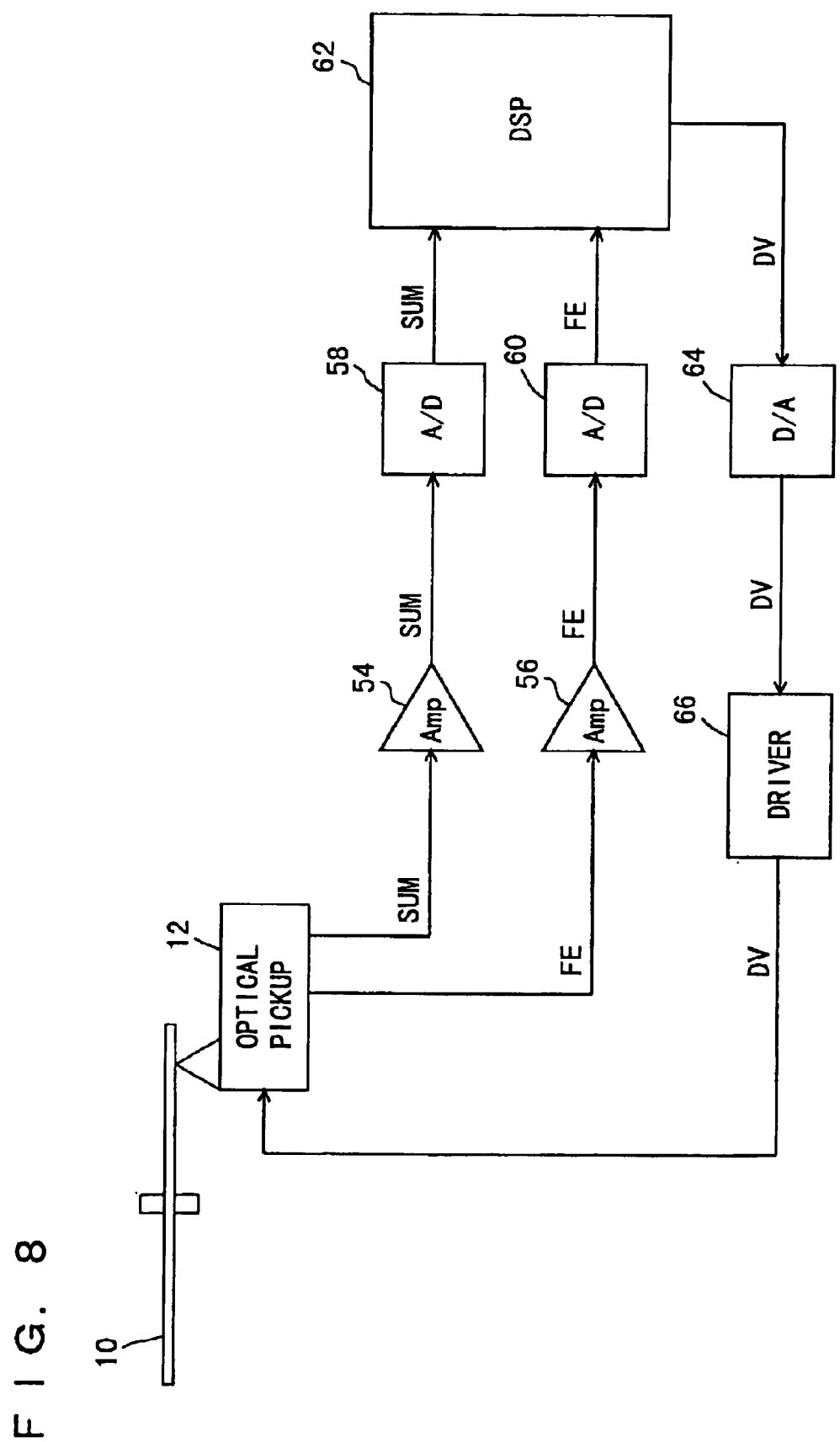
F I G. 8

F I G. 9
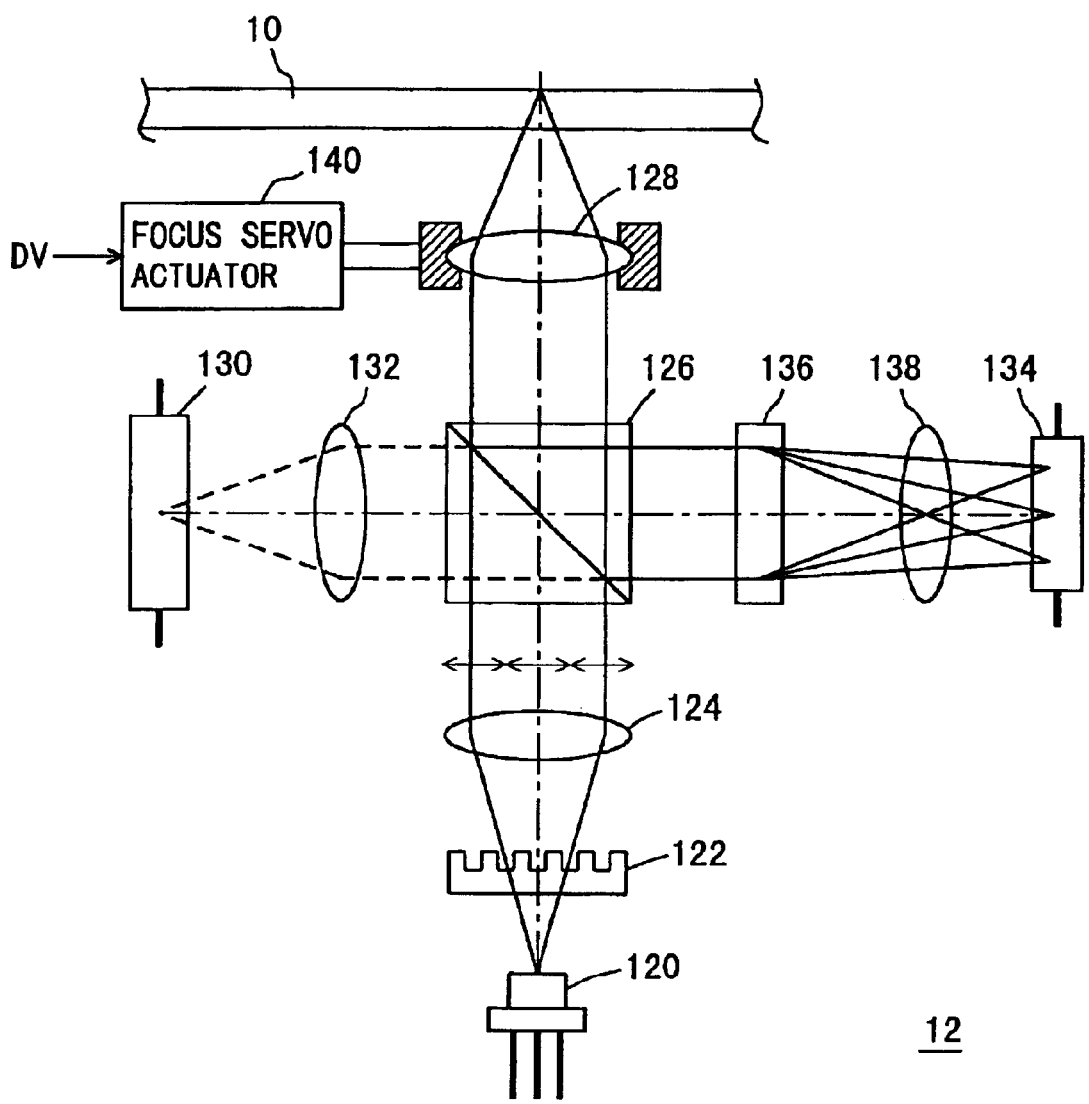

F I G. 1 3
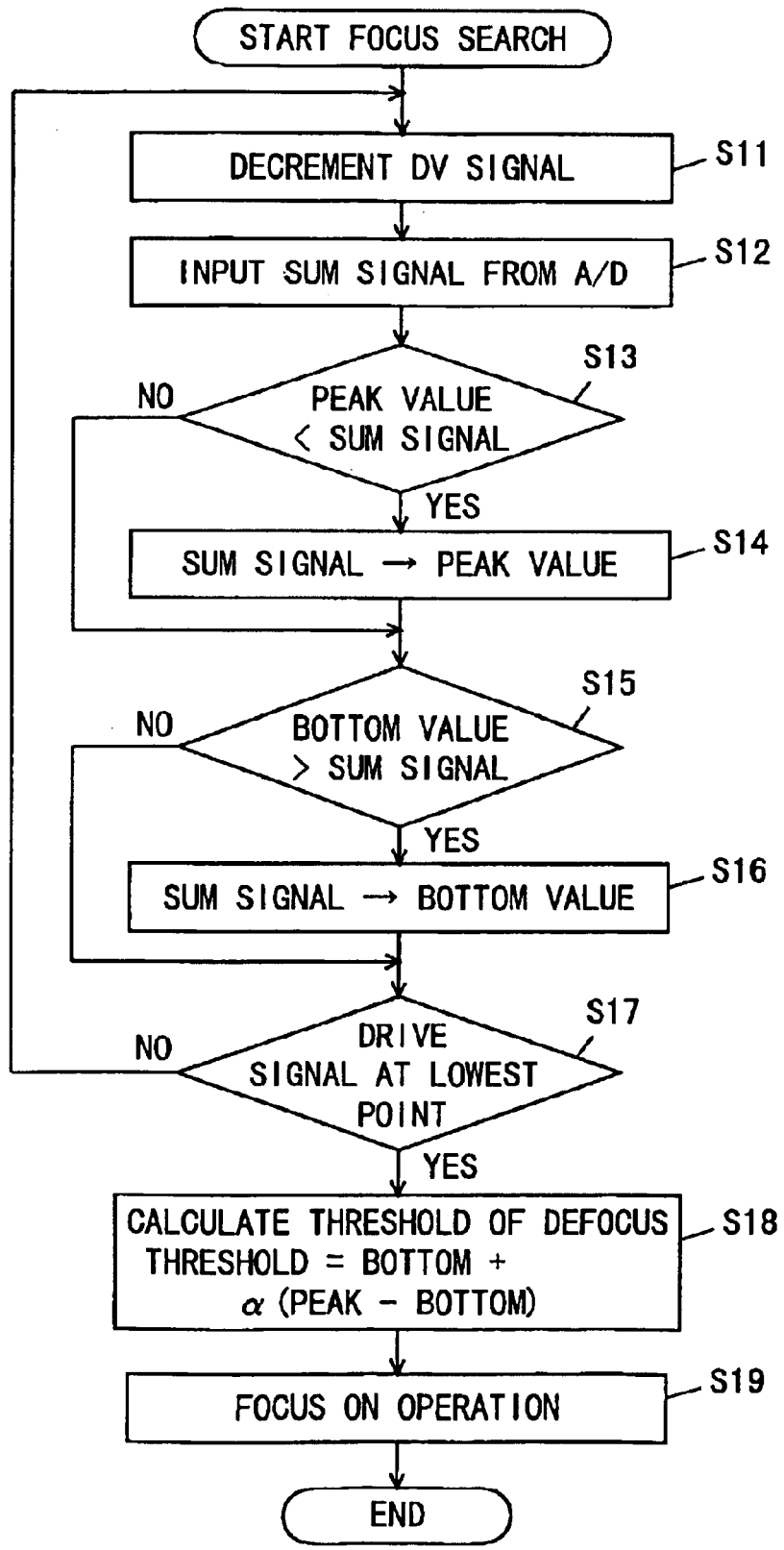

F I G. 1 6
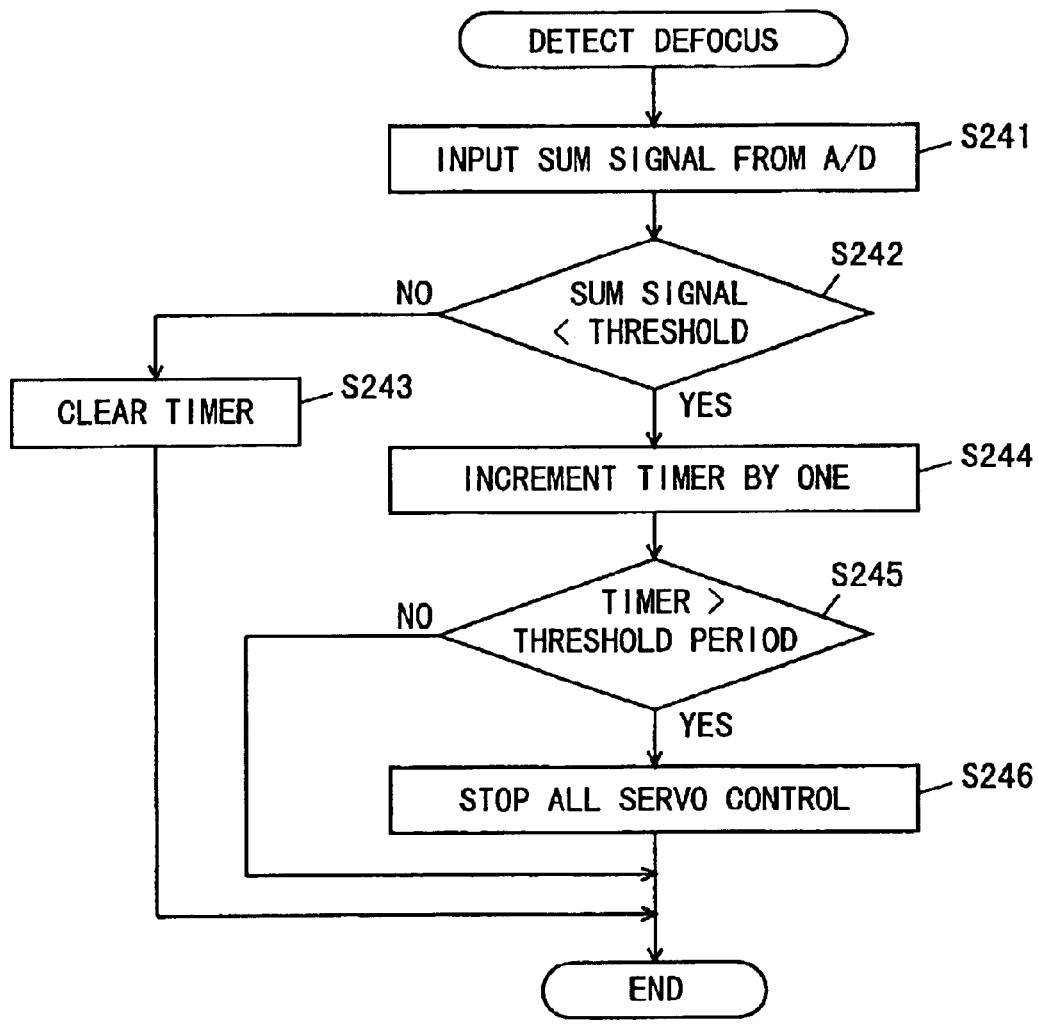

APPARATUS FOR RECORDING/ REPRODUCING SIGNAL ON/FROM OPTICAL DISK

BACKGROUND OF THE INVENTION

1. Field of the Invention

The present invention relates to optical disk apparatuses. More particularly, the invention relates to an optical disk apparatus for recording and/or reproducing a signal synchronously with a fine clock mark formed on an optical disk in advance as well as an optical disk apparatus capable of detecting defocus of an objective lens.

2. Description of the Background Art

A magneto-optical disk such as AS-MO (Advanced Storaged-Magneto Optics) has a fine clock mark which is preliminarily formed thereon for the purpose of obtaining a synchronization signal required for recording and reproducing a signal. The fine clock mark is generally formed by groove-shaped discontinuous regions arranged at regular intervals in a land or land-shaped discontinuous regions arranged at regular intervals in a groove.

An optical disk apparatus detects such a fine clock mark to generate a synchronization signal by a PLL (Phase Locked Loop) circuit and accordingly records/reproduces a signal on/from a magneto-optical disk in response to this synchronization signal.

If a defect such as scratch is present on the magneto-optical disk, the optical disk apparatus could erroneously detect this defect as a fine clock mark. Consequently, synchronization is lost in the PLL circuit and a correct synchronization signal cannot be obtained.

The optical disk apparatus also uses an optical pickup to direct a laser beam onto an optical disk and detect light reflected from the optical disk. The optical pickup has an objective lens for focusing the laser beam on the optical disk. The optical lens is caused to oscillate in the direction of its optical axis by means of focus servo control so as to allow the point of focus to track a signal surface of the optical disk.

If a great impact is externally applied or there is a large scratch on the optical disk, the focus of the objective lens could be deviated far from the upper face of the optical disk. Just a slight deviation may allow the focus servo control to adjust the focus back onto the optical disk. However, a greatly deviated focus cannot be adjusted back onto the optical disk. When this state is left as it is, a focus servo actuator continues moving the objective lens along its optical axis in only one of the directions. In this case, a correct focus servo control is impossible.

SUMMARY OF THE INVENTION

One object of the present invention is to provide an optical disk apparatus capable of distinguishing a fine clock mark from a defect such as scratch to obtain a correct fine clock mark signal.

Another object of the invention is to provide an optical disk apparatus capable of accurately performing focus servo control.

According to one aspect of the invention, an optical disk apparatus for recording and/or reproducing a signal synchronously with a fine clock mark formed in advance on an optical disk includes a sensor, a subtracter, an adder, and a defect removing circuit. The sensor has first and second regions arranged along a track of the optical disk and detects light reflected from the optical disk in each region. The subtracter subtracts an output signal from the second region from an output signal from the first region to detect the fine clock mark and generate a fine clock mark signal. The adder adds the output signal from the first region to the output signal from the second region to generate a sum signal. The defect removing circuit sets level of the fine clock mark signal to zero when level of the sum signal is lower than a predetermined level.

Preferably, the defect removing circuit includes a defect detecting circuit and a setting circuit. The defect detecting circuit generates a defect detection signal when the level of the sum signal is lower than the predetermined level. In response to the defect detection signal, the setting circuit sets the level of the fine clock mark signal to zero.

More preferably, the defect detecting circuit includes an A/D converter and a DSP (Digital Signal Processor). The A/D converter digitizes the sum signal. The DSP receives a digital sum signal from the A/D converter to activate the defect detection signal when level of the digital sum signal is lower than the predetermined level and inactivate the defect detection signal when the level of the digital sum signal is higher than the predetermined level.

Still more preferably, the DSP includes a comparator, an activating unit and an inactivating unit. The comparator compares the digital sum signal with the predetermined level. According to result of the comparison by the comparator, the activating-unit activates the defect detection signal when the level of the digital sum signal is lower than the predetermined level. The inactivating unit inactivates the defect detection signal, according to result of the comparison by the comparator, when the level of the digital sum signal is higher than the predetermined level.

Alternatively, the defect detecting circuit includes a comparator comparing the level of the sum signal with the predetermined level to generate the defect detection signal.

The subtracter of the optical disk apparatus described above detects a fine clock mark to generate a fine clock mark signal while the subtracter also detects a defect like a scratch and accordingly noise is generated in the fine clock mark signal. The amount of light reflected from a region having such a defect decreases, and therefore the level of a sum signal output from the adder drops. When the level of this sum signal is lower than a predetermined level, the level of the fine clock mark signal is set to zero. In this way, the noise generated in the fine clock mark signal is eliminated and consequently a correct fine clock mark signal can be obtained.

According to another aspect of the invention, an optical disk apparatus includes an objective lens, an optical sensor, a focus error signal generating circuit, a focus servo controller, a sum signal generating circuit, and a defocus detector. The objective lens focuses a laser beam on an optical disk. The optical sensor is divided into a plurality of regions to detect light reflected from the optical disk in each region. The focus error signal generating circuit performs arithmetic operation on respective signals output from the regions of the optical sensor to generate a focus error signal. The focus servo controller performs focus servo control for the objective lens in response to the focus error signal. The sum signal generating circuit calculates the sum of respective signals output from the regions of the optical sensor to generate a sum signal. The defocus detector determines that focus of the objective lens deviates from the optical disk when the value of the sum signal is lower than a predetermined threshold.

This optical disk apparatus performs focus servo control for the optical lens in response to the focus error signal. If the focus of the objective lens deviates far from the optical lens, the level of the sum signal greatly decreases. When the value of the sum signal is lower than the predetermined threshold, it is determined that the focus of the objective lens deviates from the optical disk.

Preferably, the optical disk apparatus further includes a focus servo control stopper to stop the focus servo control when the defocus detector determines that the focus of the objective lens deviates from the optical disk.

This optical disk apparatus stops the focus servo control when it is determined that the focus of the objective lens deviates from the optical disk. Because of this, the objective lens never continues moving on its optical axis in one of the directions only.

Preferably, the optical disk apparatus further includes a learning unit detecting a peak value and a bottom value of the focus error signal generated when the optical lens is moved in direction of its optical axis tol set the threshold between the detected peak and bottom values.

The optical disk apparatus continuously moves the objective lens in the direction of its optical axis, detects the peak and bottom values of the focus error signal generated at this time course, and sets the threshold between the detected peak and bottom values. Accordingly, a proper threshold is automatically set for each optical disk.

Preferably, the defocus detector includes a value comparator, a timer, and a period comparator. The value comparator compares the value of the sum signal with the threshold. The timer measures a time period in which the value of the sum signal is lower than the threshold based on result of the comparison by the value comparator. The period comparator compares the period measured by the timer with a predetermined threshold period.

The optical disk apparatus measures the period in which the value of the sum signal is lower than the threshold and compares the measured period with the predetermined threshold period. When the measured period exceeds the predetermined threshold period, it is accordingly determined that focus of the objective lens deviates from the optical disk. Therefore, even if the value of the sum signal is momentarily lower than the threshold, it is not determined that focus of the objective lens deviates from the optical disk and thus erroneous detection of defocus never occurs.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a block diagram showing a structure of an optical disk apparatus according to a third embodiment of the invention.

FIG. 9 shows a structure of an optical pickup in FIG. 8.

FIG. 13 is a flowchart showing a focus search operation of a DSP in FIG. 8.

FIG. 16 is a flowchart showing details of steps for detecting defocus in FIG. 15.

DESCRIPTION OF THE PREFERRED EMBODIMENTS

Figure 1:
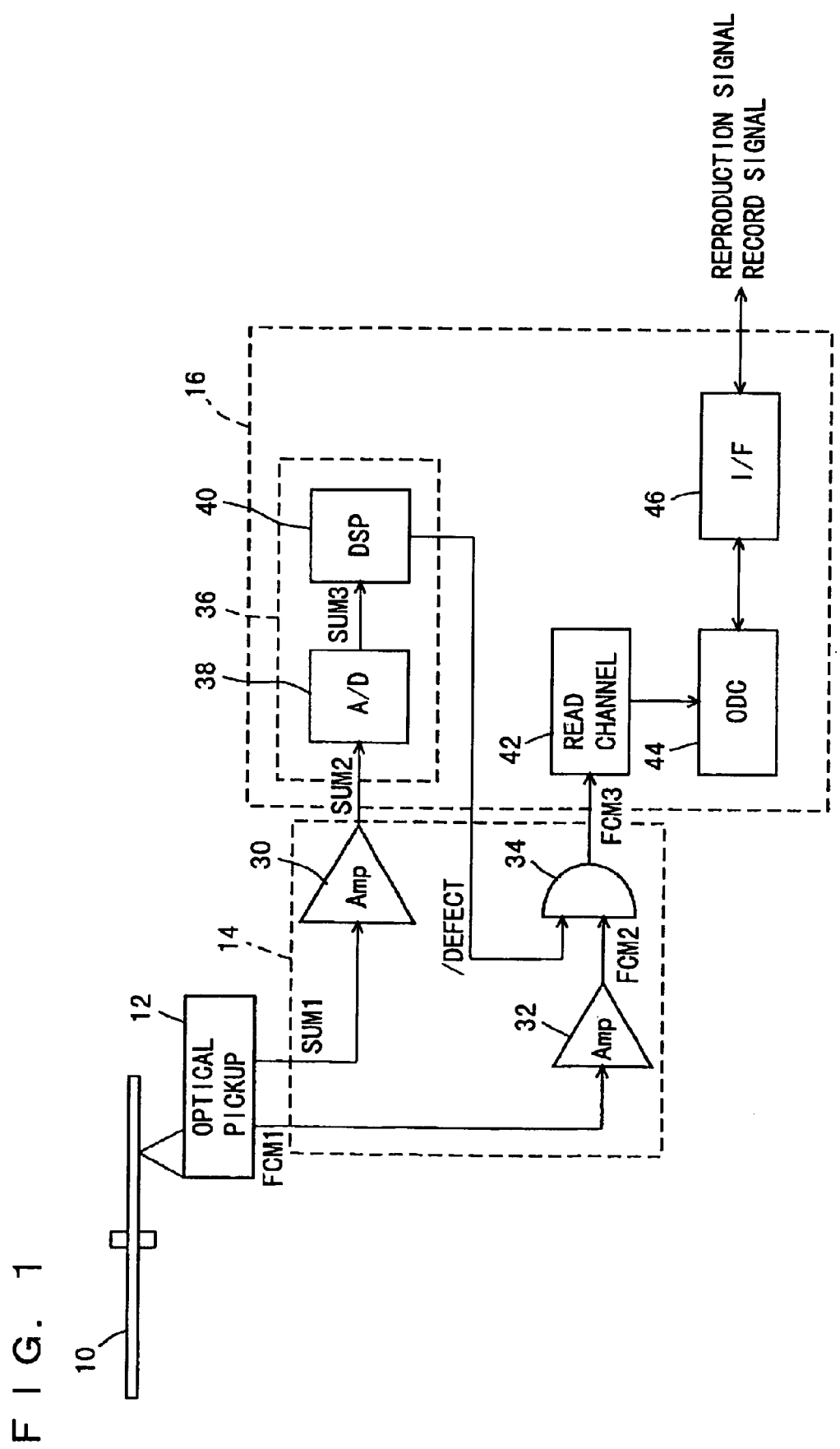
FIG. 1 is a block diagram showing a structure of an optical disk apparatus according to a first embodiment of the present invention.

Embodiments of the present invention are hereinafter described in detail in conjunction with the drawings. It is noted that like or corresponding components are denoted by the same reference character and description thereof is not repeated here.

First Embodiment

Referring to FIG. 1, an optical disk apparatus according to the first embodiment includes an optical pickup 12 directing a laser beam onto a magneto-optical disk 10 such as AS-MO to detect light reflected therefrom, a head amplifier circuit 14 amplifying various signals output from optical pickup 12, and a signal processing circuit 16 processing various signals output from head amplifier circuit 14.

Optical pickup 12 includes a semiconductor laser (not shown), an objective lens (not shown) focusing the laser beam from the semiconductor laser on magneto-optical disk 10, and an optical sensor (20 in FIGS. 2A and 3) detecting the light reflected from magneto-optical disk 10. As optical pickup 12 is well known in itself, detailed description thereof it is not given here.

Figure 2A:
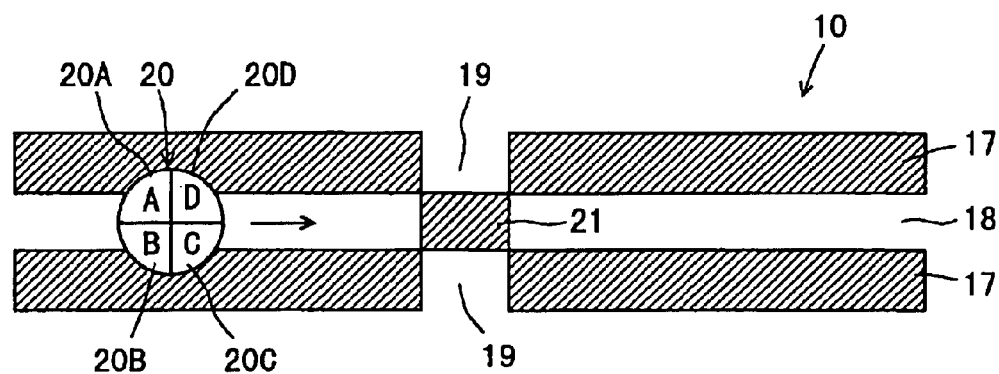
FIG. 2A is a plan view partially showing a structure of a magneto-optical disk and FIG. 2B is a waveform chart showing a fine clock mark signal generated when a fine clock mark in FIG. 2A is detected.

As shown in FIG. 2A, magneto-optical disk 10 has a land 17 and a groove 18 formed thereon. A magneto-optical recording film is formed over both of land 17 and groove 18, and land 17 and groove 18 constitute a track of magneto-optical disk 10. The track is shaped into a spiral form or concentric circles. As fine clock marks 19, groove-shaped discontinuous regions are formed at regular intervals in land 17, and land-shaped discontinuous regions are formed as fine clock marks 21 at regular intervals in groove 18.

Land 17 and groove 18 are scanned by a laser beam from optical pickup 12. Optical sensor 20 for detecting light reflected from magneto-optical disk 10 is divided into four regions 20A, 20B, 20C and 20D. Respective rear halves of regions 20A and 20B and respective front halves of regions 20C and 20D are arranged along a track formed by land 17 or groove 18. In other words, regions 20C and 20D are arranged to receive light reflected from the front half of a laser spot formed on magneto-optical disk. 10 while regions 20A and 20B are arranged to receive light reflected from the rear half of the laser spot.

Figure 3:
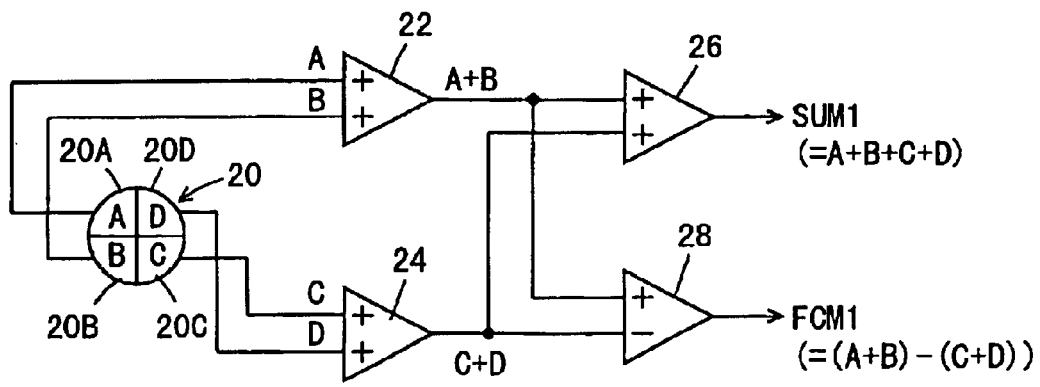
FIG. 3 is a circuit diagram showing a circuit for generating the fine clock mark signal and a sum signal in an optical pickup in FIG. 1.

Referring to FIG. 3, optical pickup 12 further includes an adder 22 co adding an output signal A from region 20A of optical sensor 20 to an output signal B from region 20B, an adder 24 adding an output signal C from region 20C to an output signal D from region 20D, an adder 26 adding a sum signal A+B output from adder 22 to a sum signal C+D output from adder 24, and a subtracter 28 subtracting the sum signal C+D output from adder 24 from the sum signal A+B output from adder 22. In this way, adder 26 generates a sum signal SUM1 (=A+B+C+D) and subtracter 28 generates a fine clock mark signal FCM1 (=(A+B)−(C+D)) as a difference signal.

If optical sensor 20 is divided into two regions, i.e., front half region and rear half region, adder 26 may add an output signal from the front region to an output signal from the rear region to generate sum signal SUM1 and subtracter 28 may subtract the output signal from the front region from the output signal from the rear region to detect fine clock marks 19 and 21 and generate fine clock mark signal FCM1.

Figure 2B:
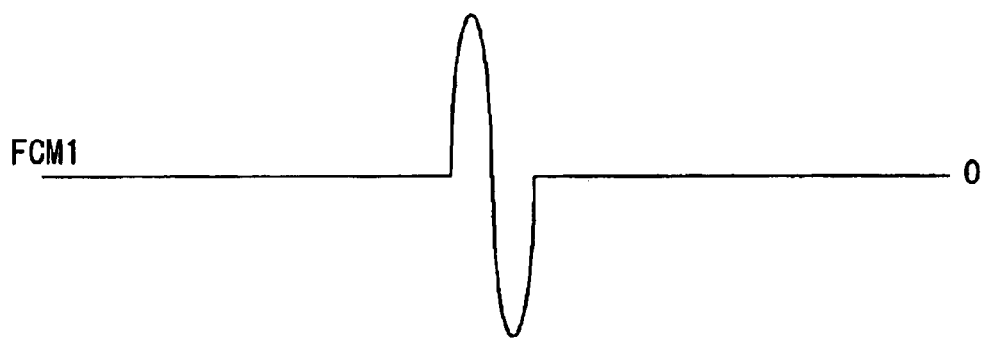

As shown in FIG. 2B, during laser beam scanning of land 17 except for fine clock mark 19 or laser beam scanning of groove 18 except for fine clock mark 21, the output signal A+B from adder 22 has the same level as that of output signal C+D from adder 24. Therefore, fine clock mark signal FCM1 output from subtracter 28 has zero level.

When the front half of a laser spot reaches and passes over fine dock mark 21 in groove 18, the level of fine clock mark signal FCM1 becomes higher than zero. When the front half of the laser spot subsequently surpasses fine clock mark 21, the level of fine clock mark signal FCM1 becomes lower than zero. This is because the amount of light reflected from fine dock mark 21 decreases. Fine clock mark signal FCM1 is generated in a similar manner when the laser spot passes fine clock mark 19 in land 17.

Referring again to FIG. 1, head amplifier circuit 14 includes an amplifier 30 amplifying sum signal SUM1 output from optical pickup 12, an amplifier 32 amplifying fine clock mark signal FCM1 output from optical pickup 12, and a gate circuit 34 passing a fine clock-mark signal FCM2 from amplifier 32 as it is when a defect detection signal /DEFECT supplied from signal processing circuit 16 is at H (logical high) level (inactive state) and setting level of fine clock mark signal FCM2 to zero when defect detection signal /DEFECT is at L (ogical low) level (active state).

Signal processing circuit 16 includes a defect detecting circuit 3G generating defect detection signal /DEFECT when a sum signal SUM2 supplied from amplifier 30 is lower than a predetermined level (threshold). Defect detecting circuit 36 specifically includes an A/D converter 38 digitizing sum signal SUM2, and a DSP 40 receiving a digital sum signal SUM3 from A/D converter 38 to activate defect detection signal /DEFECT when the level of digital sum signal SUM3 is lower than a predetermined level and inactivate defect detection signal /DEFECT when the level of digital sum signal SUM3 is higher than the predetermined level.

Figure 4:
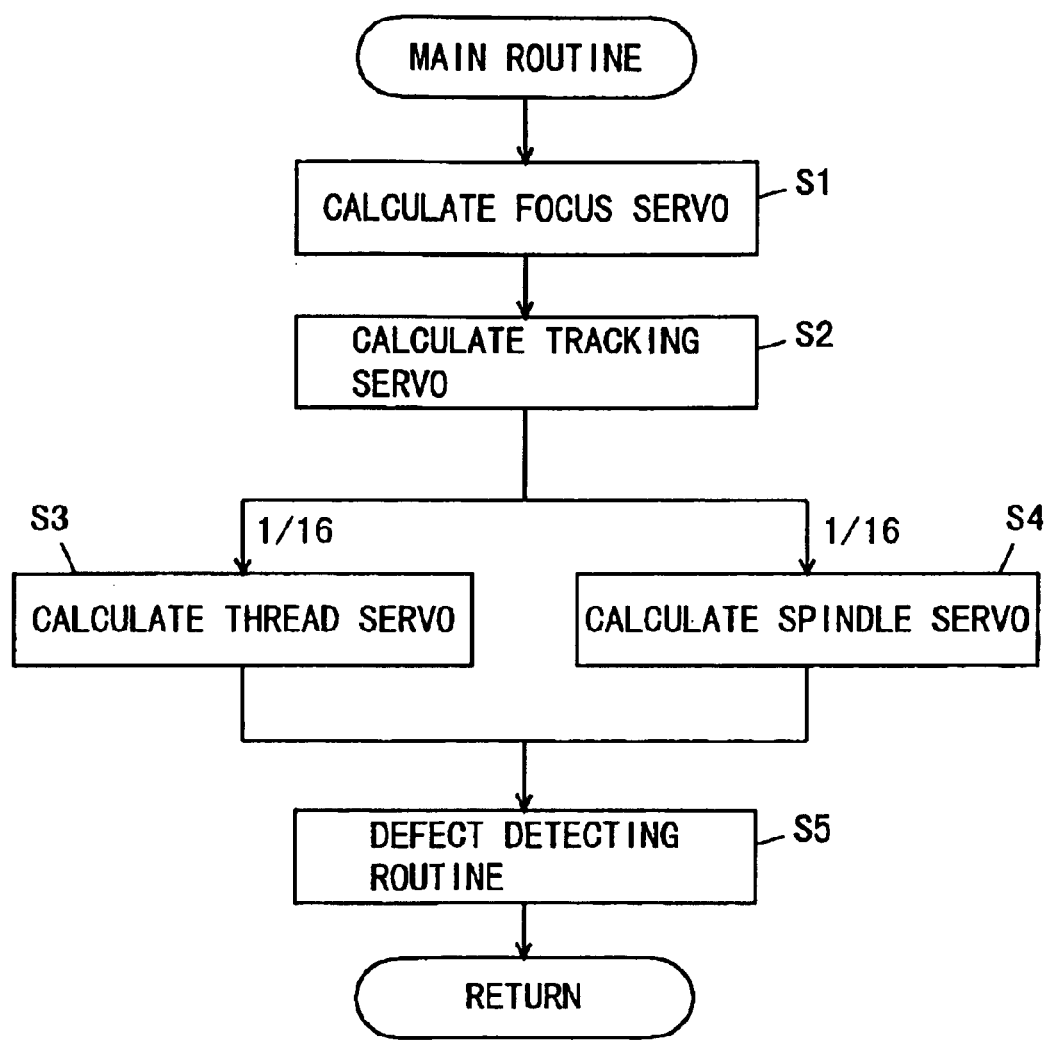
FIG. 4 is a flowchart showing a program for operating a DSP in FIG. 1.

DSP 40 operates following a program shown in FIG. 4. Specifically, optical pickup 12 performs focus servo control for the objective lens in order to focus a laser beam on magneto-optical disk 10. In step 1, a control parameter required for the focus servo control is calculated. Optical pickup 12 also performs tracking servo control for preventing the laser beam from deviating from a track. In step S2, a control parameter required for the tracking servo control is calculated. Thread servo control is further performed for speedily moving optical pickup 12 to a desired track. In step S3, a control parameter required for the thread servo control is calculated. Further, spindle servo control is carried out for rotating magneto-optical disk 10 at a predetermined rate. In step S4, a control parameter required for the spindle servo control is calculated. In step S5, in order to detect any defect such as scratch on magneto-optical disk 10, defect detection signal /DEFECT is generated when the level of sum signal SUM2 is lower than a predetermined level. DSP 40 repeatedly carries out these routines S1 to S5. However, calculation step S3 for the thread servo control and calculation step S4 for the spindle servo control are each executed once in 16 times. Routine S5 for detecting a defect is explained later in detail.

Referring to FIG. 1 again, signal processing circuit 16 further includes a read channel circuit 42 reading a signal from magneto-optical disk 10 by means of optical pickup 12 in response to a fine clock mark signal FCM3, an ODC (Optical Disk Controller) circuit 44 demodulating the signal read by read channel circuit 42 to correct any error and modulate a record signal, and an interface (I/F) circuit 46 outputting a reproduction signal from ODC circuit 44 and inputting the record signal. Read channel circuit 42 includes a PLL circuit (not shown) generating a synchronization signal used for recording and reproducing a signal in response to fine clock mark signal FCM3.

An operation of such an optical disk apparatus for distinguishing fine clock marks 19 and 21 from a defect like a scratch is now described.

Figure 5:
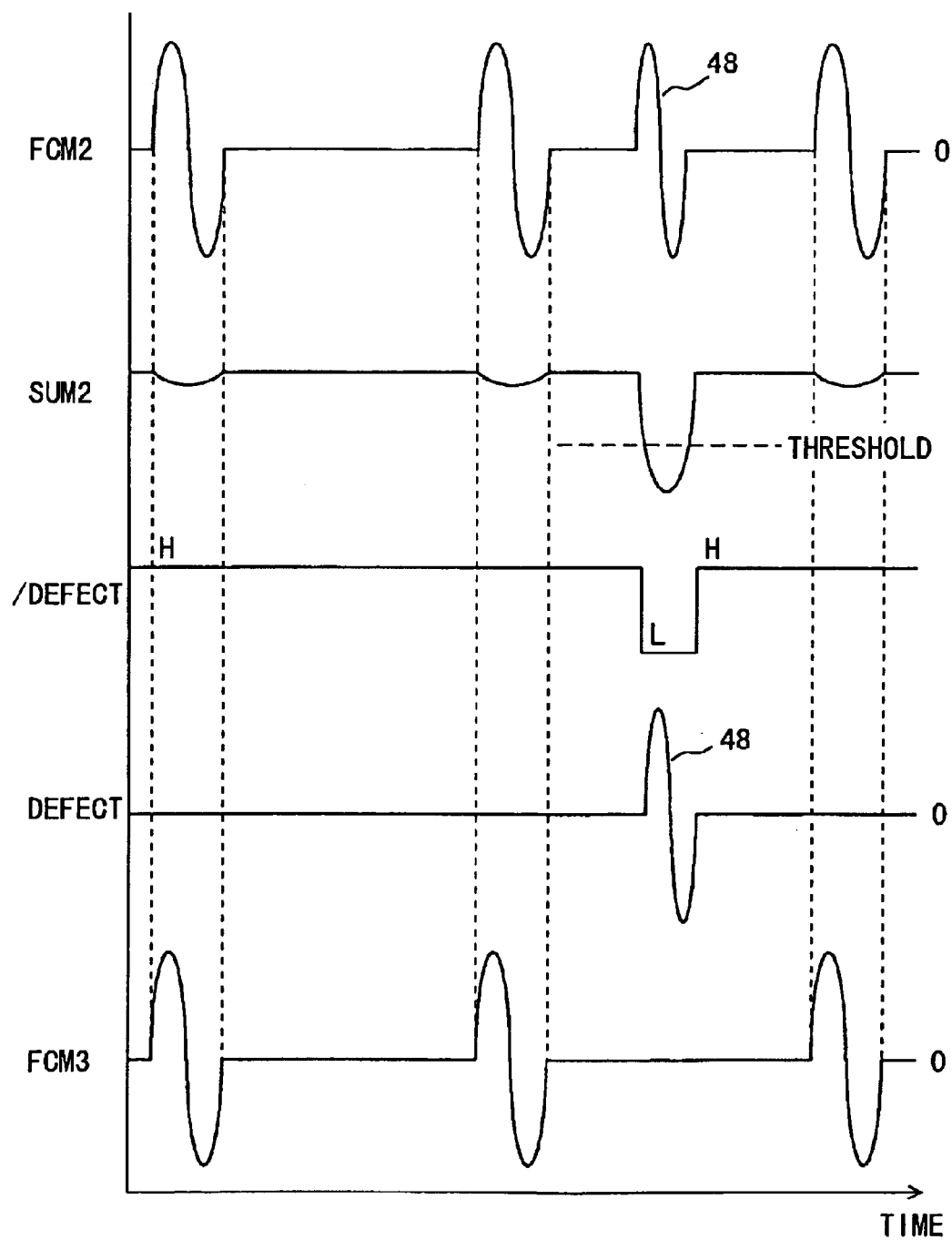
FIG. 5 is a timing chart showing an operation of the optical disk apparatus in FIG. 1.

When a laser beam directed from optical pickup 12 onto magneto-optical disk 10 passes over fine clock marks 19 and 21, fine clock mark signal FCM1 as shown in FIG. 2B is generated. This fine clock mark signal FCM1 is amplified by amplifier 32 to generate fine clock mark FCM2 as shown in FIG. 5. Since fine clock marks 19 and 21 are formed at even intervals, fine clock mark signal FCM2 should actually be generated to have a periodic pattern. However, if any defect like a scratch is present on magneto-optical disk 10, a noise 48 having a waveform similar to that of the fine clock mark signal is mixed into fine clock mark signal FCM2.

When the laser beam passes over a defect, the level of sum signal SUM2 remarkably decreases because of irregular reflection from the defective portion that considerably decreases the amount of reflected light. Although the level of sum signal SUM2 slightly drops when the laser beam passes over fine clock marks 19 and 21, it never falls greatly since fine clock marks 19 and 21 have smooth surfaces. For this reason, the level of sum signal SUM2 when the laser beam passes over a defect like scratch is approximately 1.5 to 4 times lower than the level of sum signal SUM2 when the laser beam passes over fine clock marks 19 and 21.

Figure 6:
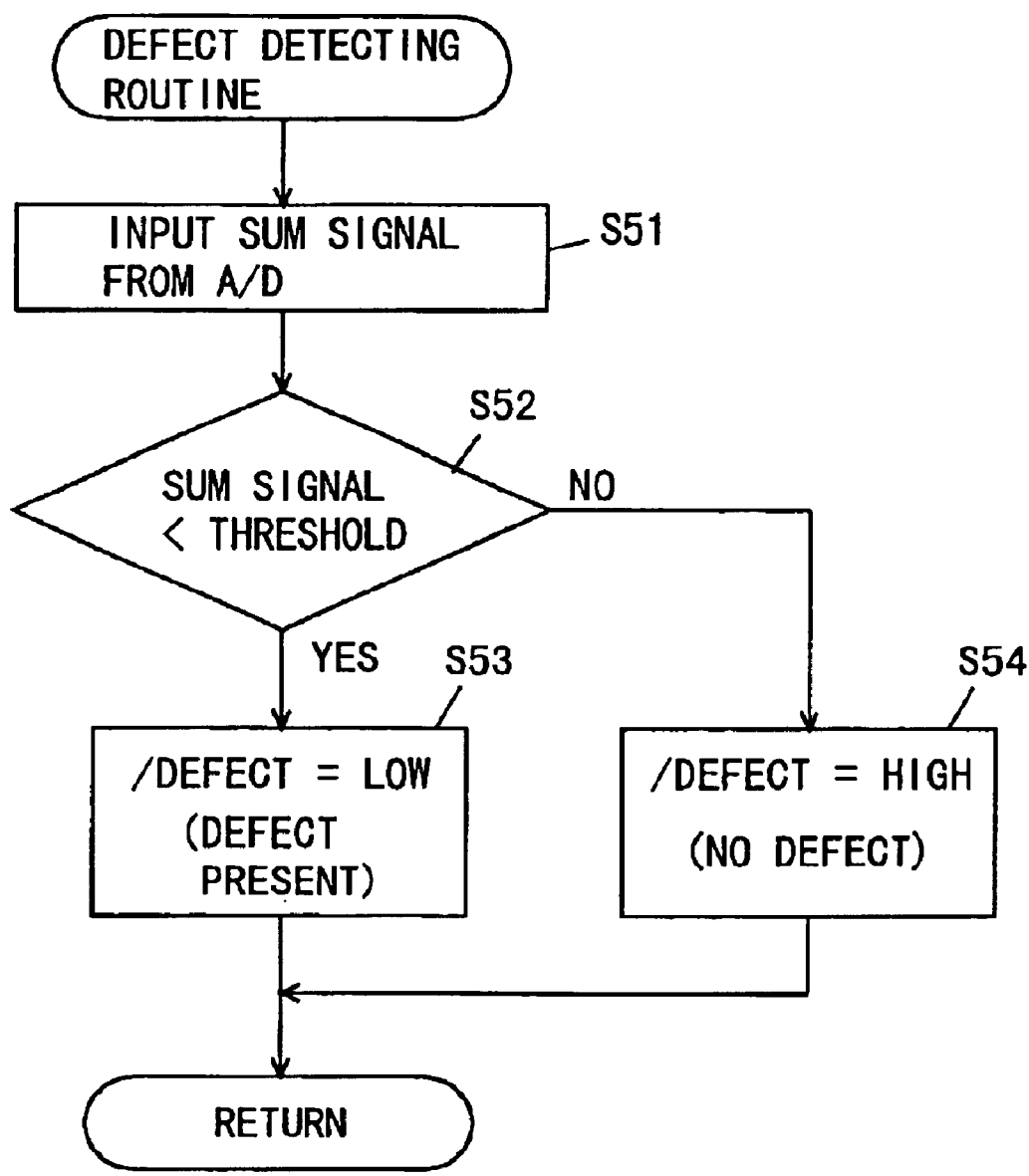
FIG. 6 is a flowchart showing details of a defect detecting routine 1 in FIG. 4.

Referring to FIG. 6 showing details of defect detection routine S5 in FIG. 4, in step S51, digital sum signal SUM3 from A/D converter 38 is supplied to DSP40.

Following this, in step S52, DSP 40 compares the level of sum signal SUM3 with a predetermined threshold. This threshold is set lower than the minimum peak level of sum signal SUM2 which is generated when the laser beam passes over fine clock marks 19 and 21 and higher than the minimum peak level of sum signal SUM2 which is generated when the laser beam passes over a defect.

According to result of this comparison, if the level of sum signal SUM2 is lower than the predetermined threshold, DSP 40 activates defect detection signal /DEFECT to L level in step S53. On the other hand, during the period in which the level of sum signal SUM2 is higher than the predetermined threshold, DSP 40 maintains defect detection signal /DEFECT in the inactive state of H level.

Defect detection signal /DEFECT is supplied to gate circuit 34. When defect detection signal /DEFECT is at H level, fine clock mark signal FCM2 from amplifier 32 passes as it is through gate circuit 34 and accordingly, fine clock mark signal FCM3 is obtained which is the same as fine clock mark signal FCM2. When defect detection signal /DEFECT is at L level, fine clock mark signal FCM2 from amplifier 32 is blocked by gate circuit 34, and the level of fine clock mark signal FCM3 is set to zero. In other words, gate circuit 34 responds to defect detection signal /DEFECT and accordingly sets the levels of fine clock mark signals FCM2 and FCM3 to zero in order to eliminate noise 48 which is generated due to a defect and mixed into fine clock mark signal FCM2.

According to the first embodiment as heretofore described, defect detecting circuit 36 and gate circuit 34 set the levels of fine clock mark signals FCM2 and FCM3 to zero when the level of sum signal SUM2 is lower than a predetermined level. In this way, it is possible to remove noise 48 which is generated when a defect such as scratch is erroneously detected as fine clock marks 19 and 21, and to generate correct fine clock mark signal FCM3 obtained by detecting fine clock marks 19 and 21 only. Consequently, the PLL circuit included in read channel circuit 42 never misses synchronization and a signal can be recorded and reproduced synchronously with fine clock marks 19 and 21.

Second Embodiment

Figure 7:
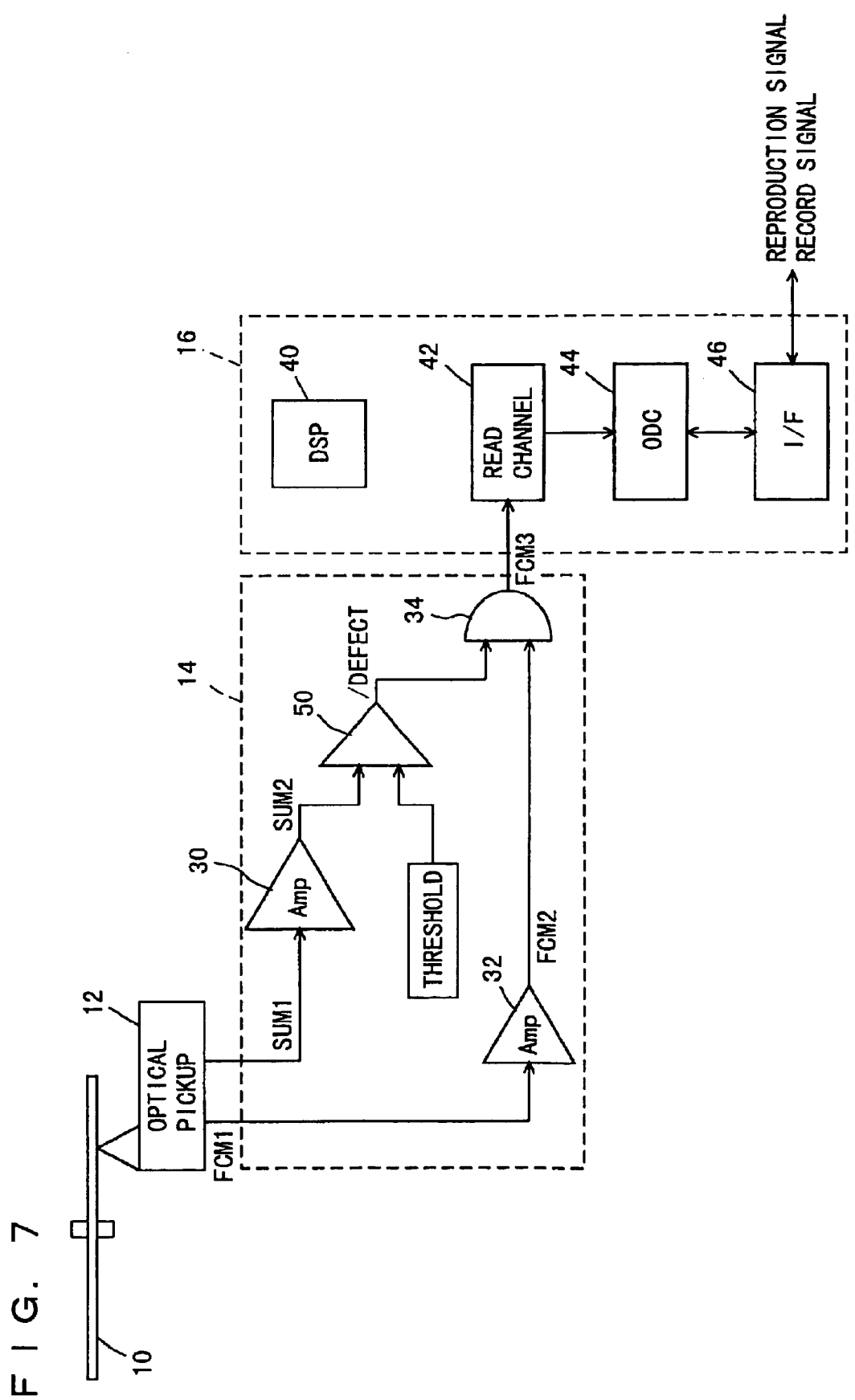
FIG. 7 is a block diagram showing a structure of an optical disk apparatus according to a second embodiment of the invention.

Referring to FIG. 7, an optical disk apparatus according to the second embodiment includes a comparator 50 comparing the level of a sum signal SUM2 from an amplifier 30 with a predetermined threshold to generate a defect detection signal /DEFECT. Here, a signal processing circuit 16 includes no A/D converter 38 like the one shown in FIG. 1, and a DSP 40 has no defect detection routine S5 as shown in FIG. 4.

This optical disk apparatus also operates as shown by the timing chart in FIG. 5. Comparator 50 and a gate circuit 34 set the levels of fine clock mark signals FCM2 and FCM3 to zero when the level of sum signal SUM2 is lower than the predetermined level. It is accordingly possible to eliminate noise 48 generated when a defect like a scratch is erroneously detected as fine clock marks 19 and 21 and to generate a correct fine clock mark signal FCM3.

As clearly understood from the above, the defect detecting circuit which generates defect detection signal /DEFECT when the level of sum signal SUM2 is lower than a predetermined level may be constituted of software like the one in the first embodiment or hardware like the one in the second embodiment.

Third Embodiment

Referring to FIG. 8, an optical disk apparatus as shown directs a laser beam onto a magneto-optical disk 10 such as AS-MO to record and reproduce a signal, and includes an optical pickup 12, amplifiers 54 and 56, A/D converters 58 and 60, a DSP 62, a D/A converter 64 and a driver 66.

Optical pickup 12 directs a laser beam onto magneto-optical disk 10 and detects light reflected from magneto-optical disk 10 to generate a sum signal SUM, a focus error signal FE and the like described in detail later. Amplifier 54 amplifies sum signal SUM from optical pickup 12. A/D converter 58 digitizes analog sum signal SUM from amplifier 54. Amplifier 56 amplifies focus error signal FE from optical pickup 12. A/D converter 60 digitizes analog focus error signal FE from amplifier 56.

DSP 62 performs focus servo control, tracking servo control, thread servo control, spindle servo control and the like in addition to modulation of a record signal and demodulation of a reproduction signal. By the focus servo control, an objective lens (128 in FIG. 9) in optical pickup 12 is caused to oscillate in the direction of its optical axis so as to focus the laser beam constantly on a signal surface of magneto-optical disk 10. By the tracking servo control, the objective lens is caused to oscillate in the radial direction of magneto-optical disk 10 so as to enable the laser beam to constantly follow a track on magneto-optical disk 10. By the thread servo control, optical pickup 12 (objective lens) is moved in the radial direction of magneto-optical disk 10 by means of feed mechanism such as linear motor so as to speedily move the laser beam to a desired track on magneto-optical disk 10. By the spindle servo control, magneto-optical disk 10 is rotated at a predetermined rate by means of a spindle motor.

For the focus servo control, DSP 62 responds to digital focus error signal FE from A/D converter 60 and outputs a digital drive signal DV for driving the objective lens. When the level of digital sum signal SUM from A/D converter 58 is lower than a predetermined level, DSP 62 determines that focus of the objective lens deviates from the signal surface of magneto-optical disk 10 and accordingly stops the focus servo control.

D/A converter 64 converts digital drive signal DV from DSP 62 to an analog signal. Instead of D/A converter 64, a PWM (Pulse Width Modulation) circuit may be employed that performs the focus servo control according to duty ratio of drive signal DV. Driver 66 enhances driving capability of analog signal DV from D/A converter 64.

Referring to FIG. 9, optical pickup 12 includes a semiconductor laser 120, a diffraction grating 122 separating a laser beam emitted from semiconductor laser 120 into three beams, a collimator lens 124 making the laser beams from diffraction grating 122 into parallel beams, a beam splitter 126, and objective lens 128 focusing the laser beams passing through beam splitter 126 on the signal surface of magneto-optical disk 10. Beam splitter 126 transmits 80% of P-polarized laser beams emitted from semiconductor laser 120, which are parallel with the plane of the drawing, and reflects remaining 20% thereof. Beam splitter 126 also reflects light reflected from magneto-optical disk 10.

An optical sensor 130 monitors the laser beams emitted from semiconductor laser 120. The power of semiconductor laser 120 is controlled in response to an output signal from sensor 130. A condensing lens 132 focuses the laser beams emitted from semiconductor laser 120 and reflected by beam splitter 126 on optical sensor 130. An optical sensor 134 detects the light reflected from magneto-optical disk 10. In response to an output signal from optical sensor 134, various reproduction signals are generated. A Wollaston prism 136 separates the laser beams reflected from magneto-optical disk 10 and further reflected by beam splitter 126 into a P-polarized component and an S-polarized component. A condensing lens. 138 focuses the laser beams from Wollaston prism 136 on optical sensor 134.

Optical pickup 12 further includes a focus servo actuator 140 causing, in response to drive signal DV from driver 66 in FIG. 8, objective lens 128 to oscillate in the direction of its optical axis so as to enable focus of objective lens 128 to constantly position on the signal surface of magneto-optical disk 10.

Figure 10:
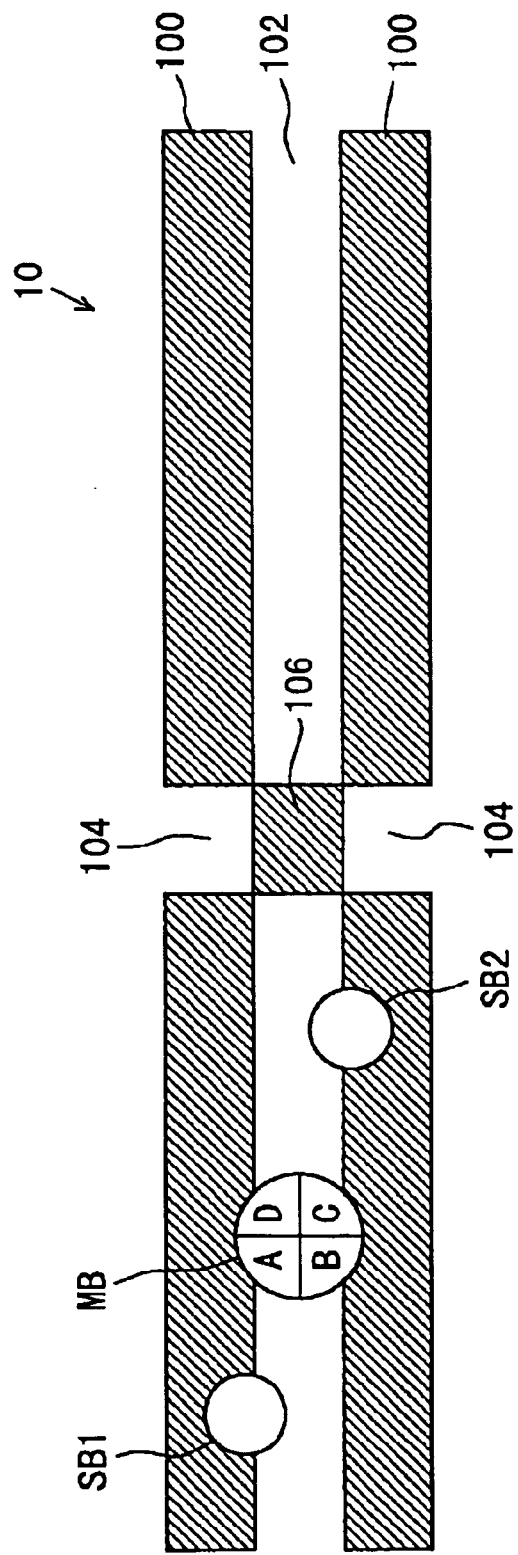
FIG. 10 is a plan view showing a structure of a magneto-optical disk in FIGS. 8 and 9 together with a beam spot.

Referring to FIG. 10, a land 100 and a groove 102 are formed on magneto-optical disk 10. A magneto-optical recording film is formed over both of land 100 and groove 102. Land 100 and groove 102 form a track of magneto-optical disk 10. The track is shaped into a spiral form or concentric circles. A large number of fine clock marks 104 and 106 are formed at regular intervals in land 100 and groove 102 respectively. Fine clock marks 104 are formed by groove-shaped discontinuous regions in land 100 while fine clock marks 106 are formed by land-shaped discontinuous regions in groove 102.

Since optical pickup 12 employs three-beam system as described above, a main beam spot MB and two sub-beam spots SB1 and SB2 are formed on magneto-optical disk 10. In FIG. 10, main beam spot MB is formed on groove 102.

Figure 11:
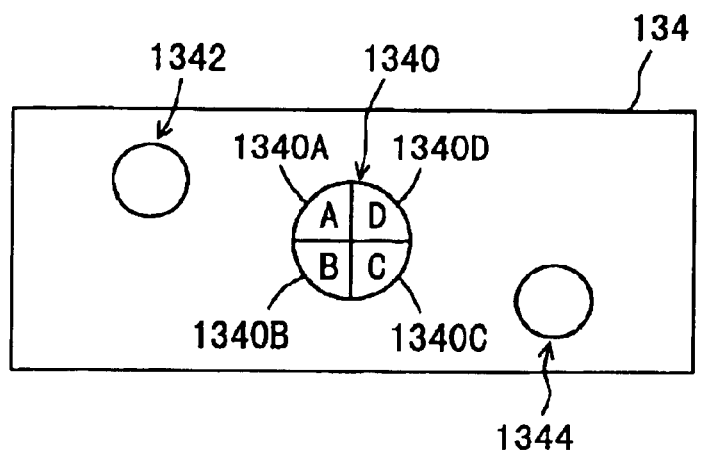
FIG. 11 is a plan view showing a structure of an optical sensor for detecting light reflected from the magneto-optical disk in FIG. 9.

Referring to FIG. 11, optical sensor 134 includes a main sensor 1340 arranged to receive light reflected from main beam spot MB, a sub-sensor 1342 arranged to receive light reflected from sub-beam spot SB1, and a sub-sensor 1344 arranged to receive light reflected from sub-beam spot SB2. Main sensor 1340 is divided into four regions 1340A, 1340B, 1340C and 1340D. Region 1340A receives light reflected from a region A of main beam spot MB, region 1340B receives light reflected from a region B, region 1340C receives light reflected from a region C and region 1340D receives light reflected from a region D.

Figure 12:
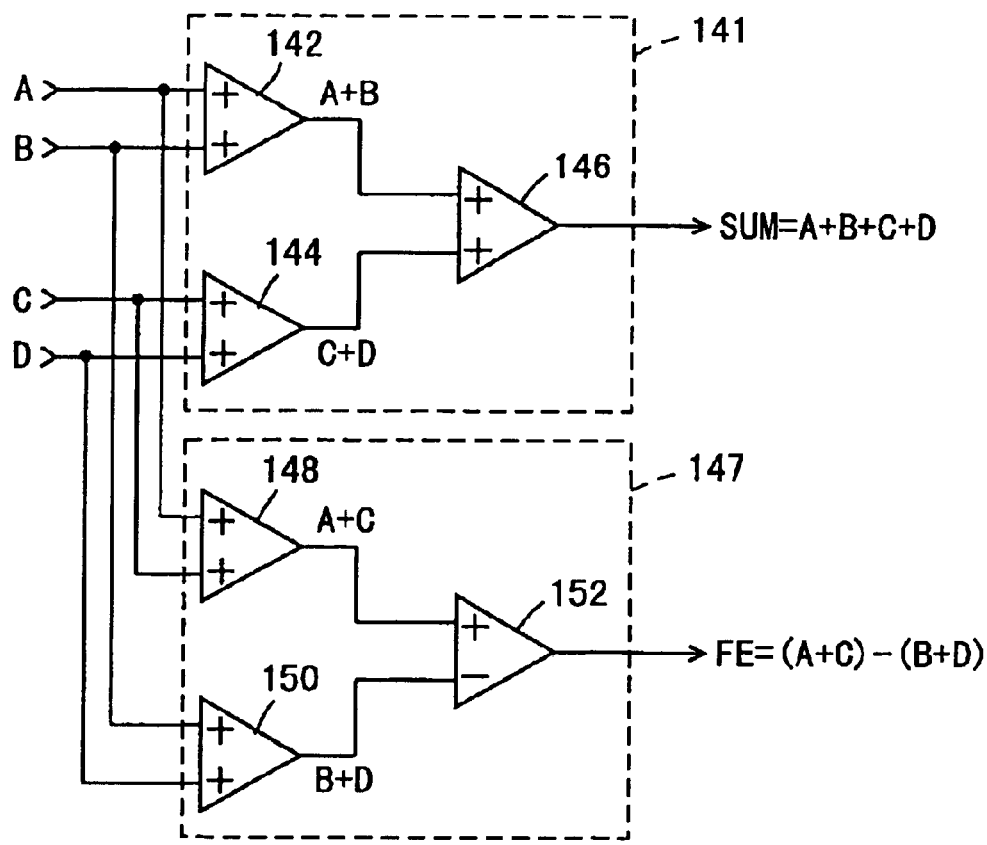
FIG. 12 is a circuit diagram showing a structure of a sum signal generating circuit and a focus error signal generating circuit included in the optical pickup in FIG. 8.

Referring to FIG. 12, optical pickup 12 further includes a sum signal generating circuit 141 calculating the sum of respective output signals A, B, C and D from regions 1340A, 1340B, 1340C and 1340D of main sensor 1340 to generate sum signal SUM, and a focus error signal generating circuit 147 performing arithmetic operation on these output signals A, B, C and D to generate focus error signal FE. Sum signal generating circuit 141 includes adders 142, 144 and 146. Focus error signal generating circuit 147 includes adders 148 and 150 and a subtracter 152. Adder 142 adds output signal A from region 1340A of main sensor 1340 to output signal B from 1 region 1340B. Adder 144 adds output signal C from region 1340C to output signal D from region 1340D. Adder 146 adds an output signal A+B from adder 142 to an output signal C+D from adder 144 to obtain sum signal. SUM (=A+B+C+D). Adder 148 adds output signal A from region 1340A to output signal C from region 1340C. Adder 150 adds output signal B from region 1340B to output signal D from region 1340D. Subtracter 152 subtracts an output signal B+D from adder 150 from an output signal A+C from adder 148 to obtain a difference signal as focus error signal FE(=(A+C)−(B+D)).

Optical pickup 12 further includes a circuit (not shown) performing arithmetic operation on respective output signals from sub-sensors 1342 and 1344 according to DPP (Differential Push Pull) method to generate a tracking error signal.

An operation of this optical disk apparatus is now described.

Figure 14:
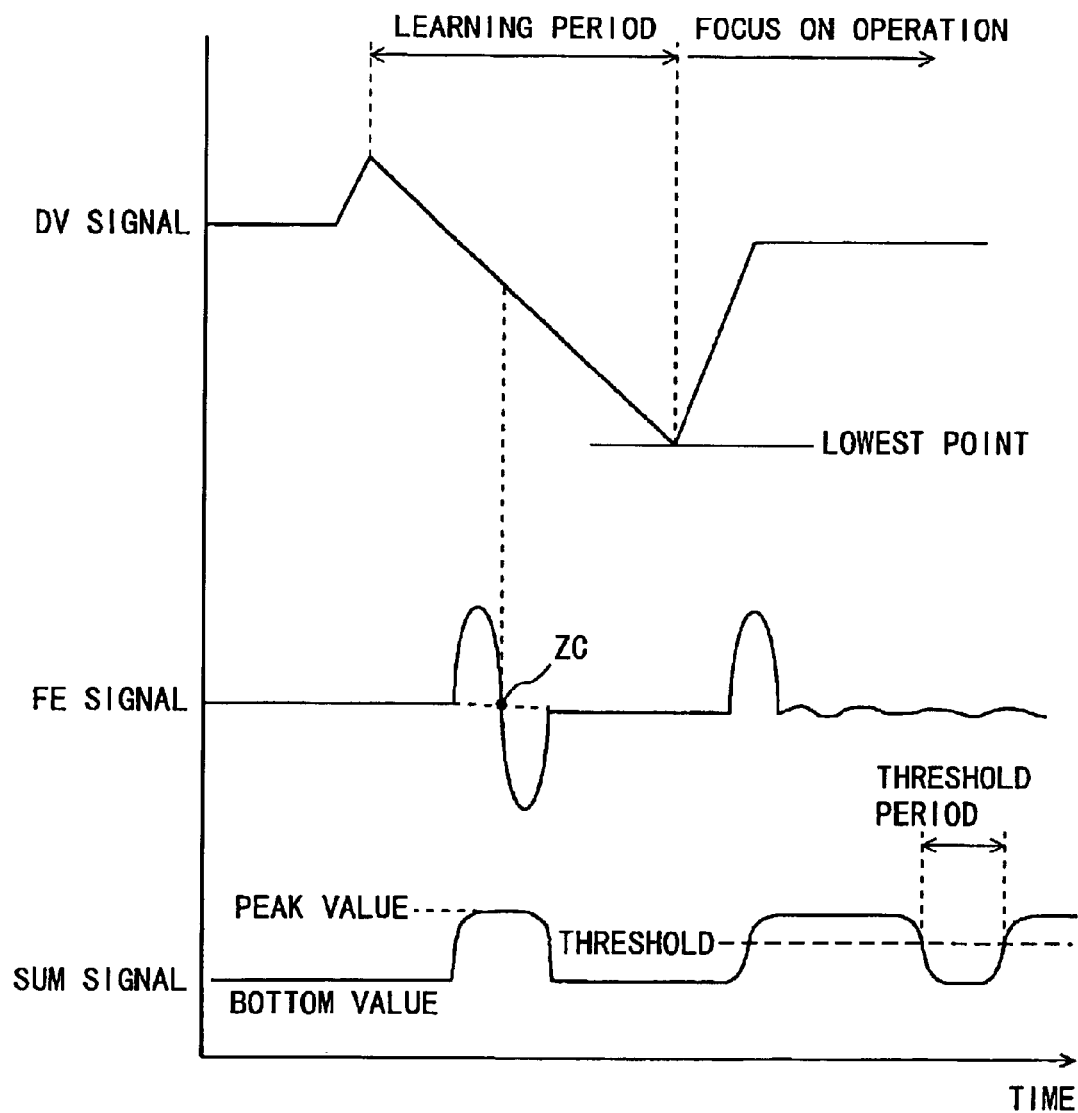
FIG. 14 is a timing chart showing respective waveforms of a drive signal, a focus error signal and a sum signal generated when the optical disk apparatus in FIG. 8 performs the focus search operation and a normal operation.

DSP 62 operates following a program shown in FIG. 13. Specifically, in step S11, drive signal DV for driving focus servo actuator 140 is decremented as shown in FIG. 14.

In step S12, DSP 62 takes sum signal SUM output from A/D converter 58.

In step S13, DSP 62 compares value of the taken sum signal SUM on with a peak value which is preliminarily written in a memory. In this memory, the value of ground voltage is written in advance that is the minimum value as an initial value of the peak value.

If result of the comparison in step S13 shows that the value of sum signal SUM is higher than the peak value stored in the memory, that value of sum signal SUM is overwritten in the memory as a new peak value in step S14. On the contrary, if the value of sum signal SUM is lower than the, stored peak value, such overwriting is not carried out. In these steps S13 and S14, the peak value of sum signal SUM can be detected.

In step S15, the value of sum signal SUM taken in step S12 is compared with a bottom value preliminarily written in the memory. In this memory, the value of supply voltage is written in advance that is the maximum value as an initial value of the bottom value.

If result of the comparison in step S15 indicates that the value of sum signal SUM is lower than the bottom value stored in the memory, that value of sum signal SUM is overwritten in the memory as a new bottom value. If the value of sum signal SUM is higher than the stored bottom value, no such overwriting is performed. In these steps S15 and S16, the bottom value of sum signal SUM can be detected.

As the value of drive signal DV is gradually reduced in step S11, focus error signal FE in an almost 1 shape is output from optical pickup 12 while the focus of objective lens 128 passes across the signal surface of magneto-optical disk 10. The zero-crossing point ZC of this focus error signal FE is a focal point. Although sum signal SUM has the bottom value when it deviates far from the focal point, sum signal SUM increases as it approaches the focal point to reach the peak value at the focal point.

Referring again to FIG. 13, in step S17, it is determined whether or not the value of drive signal DV reaches the lowest point. If the value of drive signal DV does not arrive at the lowest point, operations in steps S11 to S16 are repeated. If the value of drive signal DV reaches the lowest point, following step S18 is performed. In this way, DSP 62 can detect the peak and bottom values of focus error signal FE generated when objective lens 128 is continuously moved in the direction of its optical axis.

In step S18, threshold of sum signal SUM corresponding to defocus is calculated according to the following expression:

threshold=bottom value+α(peak value−bottom value)

where $0<\alpha<1$, preferably $0.4<\alpha<0.6$, and more preferably $\alpha=0.5$.

In step S19, the focus servo control is made ON.

Figure 15:
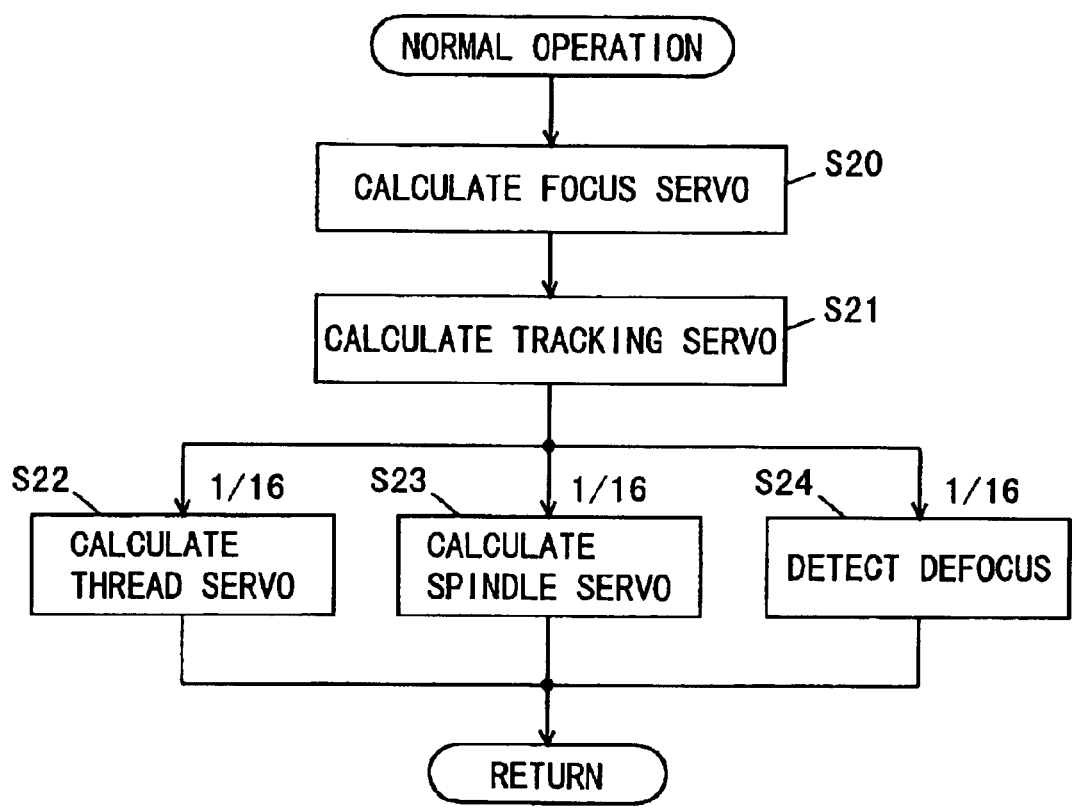
FIG. 15 is a flowchart showing a normal operation by the DSP in FIG. 8.

After such a focus search operation as described above is completed, DSP 62 operates following a program shown in FIG. 15. Specifically, in step S20, DSP 62 calculates a parameter required for phase compensation of the focus servo control.

In step S21, a parameter required for phase compensation of the tracking servo control is calculated.

Following this, a parameter required for phase compensation of the thread servo control is calculated in step S22, or a parameter required for phase compensation of the spindle servo control is calculated in step S23, or defocus described below is detected in step S24.

The routine shown in FIG. 15 is repeatedly performed. However, steps S22 to S24 are carried out only once in 16 times.

Referring now to FIG. 16, details of step S24 for detecting defocus are described.

In step S241, sum signal SUM output from A/D converter 58 is taken.

In step S242, value of sum signal SUM thus taken is compared with the threshold which is set in advance in step S18 described above. During the period in which the point of focus of objective lens 128 is located on or fairly close to the signal surface of magneto-optical disk 10, the value of sum signal SUM is nearly at its peak and is higher enough than the threshold as shown in FIG. 14. In this case, a timer (e.g. value of a memory region prepared as a timer region) is cleared in step S243.

When the focus of objective lens 128 deviates far from the signal surface of magneto-optical disk 10, the value of sum signal SUM significantly decreases as shown in FIG. 14. When the value of sum signal SUM becomes lower than the threshold, the timer is incremented by one in step S244.

In step S245, a period measured by the timer is compared with a predetermined threshold period (e.g. at least 30 milliseconds).

When the period measured by the timer exceeds the threshold period, all servo controls including the focus servo control are stopped in step S246. As long as the period measured by the timer does not exceed the threshold period, this step S246 is skipped.

Accordingly, when the value of sum signal SUM is lower than the threshold and this state lasts for the predetermined threshold period, all servo controls are stopped.

As heretofore described, according to the third embodiment, the value of sum signal SUM is compared with a predetermined threshold to determine whether or not the value of sum signal SUM is lower than the threshold. It is thus possible to detect that the focus of objective lens 128 deviates far from the signal surface of magneto-optical disk 10.

Further, when such defocus is detected, all servo controls including the focus servo are ended. Owing to this, focus servo actuator 140 never moves objective lens 128 successively in only one of the directions.

The peak and bottom values of sum signal SUM generated when objective lens 128 is continuously moved in the direction of its optical axis are detected in advance. The threshold is preliminarily set between the detected peak and bottom values and accordingly, a threshold appropriate for each magneto-optical disk 10 is obtained through learning. Therefore, whether a magneto-optical disk has a number of scratches or a few scratches, defocus can surely be detected.

When the period in which the value of sum signal SUM is lower than the threshold continues to exceed a predetermined threshold period, it is determined that the focus of objective lens 128 deviates from the signal surface of magneto-optical disk 10. Therefore, defocus is never erroneously detected when the value of sum signal SUM momentarily drops.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disk apparatus recording and/or reproducing a signal synchronously with a fine clock mark formed in advance on an optical disk, comprising:
    a sensor having first and second regions arranged along a track of said optical disk and detecting light reflected from said optical disk in each region;
    a subtracter subtracting an output signal from said second region from an output signal from said first region to detect said fine clock mark and generate a fine clock mark signal;
    an adder adding the output signal from said first region to the output signal from said second region to generate a sum signal; and
    a defect remover setting a level of said fine clock mark signal to zero when a level of said sum signal is lower than a predetermined level.

2. The optical disk apparatus according to claim 1, wherein said defect remover includes:
    a defect detector generating a defect detection signal when the level of said sum signal is lower than said predetermined level; and
    a setter setting the level of said fine clock mark signal to zero in response to said defect detection signal.

3. The optical disk apparatus according to claim 2, wherein said defect detector includes:
    an A/D converter digitizing said sum signal; and
    a DSP receiving a digital sum signal output from said A/D converter to activate said defect detection signal when level of said digital sum signal is lower than said predetermined level and inactivate said defect detection signal when the level of said digital sum signal is higher than said predetermined level.

4. The optical disk apparatus according to claim 3, wherein said DSP includes:
    a comparator comparing the level of said digital sum signal with said predetermined level;
    an activator activating said defect detection signal when the level of said digital sum signal is lower than said predetermined level according to result of comparison by said comparator; and
    an inactivator inactivating said defect detection signal when the level of said digital sum signal is higher than said predetermined level according to result of comparison by said comparator.

5. The optical disk apparatus according to claim 2, wherein said defect detector includes a comparator comparing the level of said sum signal with said predetermined level to generate said defect detection signal.

* * * * *